United States Patent Office 2,761,033
Patented Aug. 28, 1956

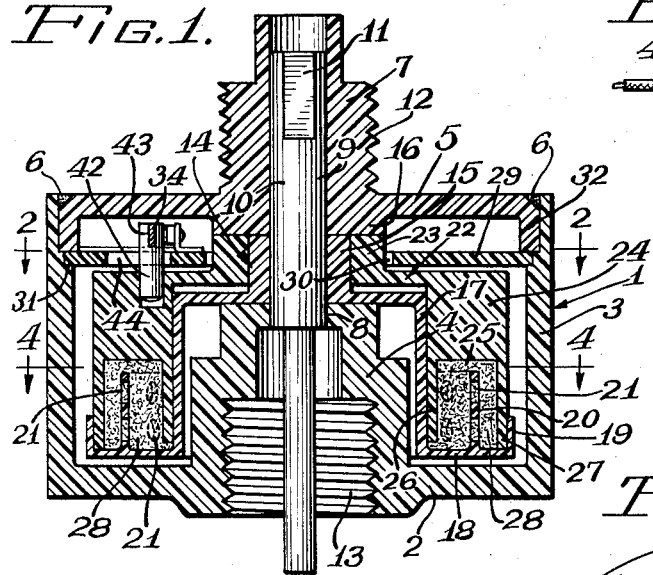

2,761,033
SPEED RESPONSIVE CONTROL DEVICE

Lewis E. Thatcher, Chicago, Ill., assignor to Gaylord Products, Incorporated, Chicago, Ill., a corporation of Delaware Application April 25, 1955, Serial No. 503,411
6 Claims. (Cl. 200—80)

This invention relates to improvements in a speed responsive control device for actuating an electric switch in response to the rotary speed of a rotating body.

It is frequently desirable in many environments to energize or deenergize an electric circuit in response to the speed of movement of a body. For instance, in conjunction with automotive vehicles speed governors are frequently employed to limit the speed of the vehicle when a predetermined maximum vehicle speed is reached; also in conjunction with automotive vehicles anticreep devices are employed which are actuated or controlled by the movement of the vehicle. In either case, mentioned hereinbefore, the actual control can be effected electrically by the agency of a control device which may actuate or deactuate an electric switch in response to movement of the vehicle. Also, in environments other than automotive vehicles a control of a similar nature is of advantage.

The present invention contemplates such a control and contemplates means for actuating or deactuating an electric switch to exercise a predetermined operational control in response to the speed of movement of a body associated with or related to the mechanism being controlled.

Briefly described the device comprising the present invention comprises a rotating cup-like driving member rigidly secured to a rotating body, the speed of rotation of which is to exercise the desired control. The cup-like driving member carries a viscous fluid and a follower or driven member dips in said fluid and is influenced by the viscous friction to follow the rotation of the driving member. An electric switch is associated with the driven or follower member whereby said switch is actuated by a predetermined speed of rotation of said driving member to exercise the desired control.

Other objects, advantages and features of the present invention will be apparent from the accompanying drawing and following detailed description.

In the drawing,

Fig. 1 is a sectional elevational view of a device embodying the concepts of the present invention.

Fig. 2 is a top plan sectional view taken on line 2—2 of Fig. 1 showing the parts in switch-closed position.

Fig. 3 is a fragmentary view similar to that shown in Fig. 2 showing the parts in switch-open position.

Fig. 4 is a horizontal sectional view taken on line 4—4 of Fig. 1.

Referring in detail to the drawing, 1 indicates a housing which is substantially cup-shaped, having a bottom 2, lateral wall 3 and an open top. An inwardly extending protrusion or boss 4 projects into the interior of the housing and is preferably formed integral with the bottom 2 of the housing. A closure 5 is adapted to be positioned over the open mouth of the housing 1, being preferably sealed to the upper edge of the lateral wall 3 by means of cement or the like 6. A boss 7 is formed integral with the closure 5, said boss extending outwardly of the housing proper.

The bosses 4 and 7 are provided with internal bores 8 and 9, respectively, for the reception of a rotatable shaft 10. One end of the shaft 10 is notched as at 11 in Fig. 1, whereby it may be secured or coupled to an external rotating body or cable, and the opposite end thereof may also be suitable for connection to an external rotating body or cable. For example the device comprising the present invention may be connected intermediate the length of a speedometer cable whereby the device will be responsive to the speed of movement of an automobile. If used in this environment, the external portion of boss 7 may carry threads 12 whereby it may be coupled to a female coupling (not shown) carried by the sheath of a speedometer cable. For the same purpose, the inner portion of boss 4 may carry threads 13 whereby the device may be coupled to a male coupling (not shown) carried by the sheath of the speedometer cable.

A driving rotor 14 is rigidly carried upon shaft 10 within the housing 1, said rotor having a sleeve portion 15 which abuts at one end against a boss 16 formed integral with the cover 5 and extending inwardly into the body of the housing. The opposite end of the sleeve portion 15 of the driving rotor 14 extends radially outwardly and downwardly to form an inverted cup-shaped member 17, the inner portion of said cup-shaped member resting upon the upper portion of the boss 4. In this fashion the driving rotor 14 is rotatable within the housing 1 and is confined between the boss 4 and boss 16.

The lower edge of the cup-shaped portion 17 terminates in an annularly extending flange 18 which has an annular upturned portion 19 at its periphery. Intermediate the width of the flange 18 an upwardly extending annular wall 20 is carried, said wall being provided with a plurality of apertures 21.

A driven rotor 22 is also positioned within the housing 1, said rotor having a collar portion 23 which rotatably embraces the outer portion of sleeve 15. The driven rotor 22 is also substantially cup-shaped having a downwardly extending wall 24. The annular wall 24 is of relatively great radial thickness and at its terminating edge an annular recess 25 is provided, being defined by an inner and an outer relatively thin annular wall 26 and 27 respectively comprising a termination of the wall 24. The wall 24 of the driven rotor extends into the annular recess provided by the wall 17, flange 18 and upwardly extending edge 19 of the driven rotor. However, the rotors are independently movable relative to each other, that is, the entire driven rotor 22 is independently rotatable with respect to the driving rotor 14.

To afford a driving connection between the driving rotor 14 and driven rotor 22 the recess 25 carries a viscous fluid 28, said fluid also being carried in the annular outer recess provided by the flange 18 and upwardly extending annular ledge 19. The fluid 28 preferably comprises a silicone oil, grease or paste which, when the rotors are stationary, flows through the apertures 21 in the annular wall 20. In this fashion a frictional connection is made between the two rotors whereby when the driving rotor rotates the driven rotor tends to rotate therewith. The frictional connection thus formed is dependent upon the characteristics of the fluid 28. If the fluid is of relatively high viscosity, the frictional connection between the rotors is relatively strong. Thus, by suitably selecting the fluid 28, particularly as to its physical characteristics, a predetermined rotation of the driving rotor 14 will impart a predetermined torque to the driven rotor 22.

A plate 29 is positioned within the housing 1, said plate being provided with a central aperture 30 in which the collar 23 of the driven rotor 22 is loosely positioned. The outer periphery of plate 24 rests upon an annular shoulder 31 formed in the inner side wall 3 of the housing 1. The closure disc 5 carries a downwardly extending annular flange 32 which functions to confine the outer peripheral portion of plate 29 upon shoulder 31. In this fashion the plate 29 is maintained in a stationary position within the housing 1.

An anchor pin 33 is mounted upon the upper surface of the plate 29 and one end portion of a spring 34 is secured to the anchor pin 33. The anchor pin 33 also functions as an electrode, said pin being connected by buss bar 35 to a conductor 36 which extends outwardly from the housing 1 and connects with a suitable electric control circuit (not shown). The opposite end of spring 34 is unattached and carries an electrical contact point 37. An electrical contact point 38 is positioned adjacent the contact point 37 and is connected by means of buss bar 39 to a conductor 40 which also comprises a portion of the electric control circuit to which the conductor 36 is connected. The contact point 38 and buss bar 39 are insulated from the plate 29. The arrangement is such that when the contact points 37 and 38 are brought together the circuit comprising the conductors 36 and 40 is completed whereas when said contact points separate said circuit is deenergized.

A cam slot 41 is provided in the upper portion of the driven rotor 22, said slot functioning as a guide for a cam pin 42, the lower end of which is loosely positioned in the slot 41. The upper portion of the cam pin 42 is provided with a slot 43 which embraces and is secured to spring 34. The pin 42 extends through an opening 44 provided in plate 29 adjacent the contact points 37 and 38.

In operation, when the shaft 10 rotates, the driving rotor 14 is rotated therewith. Depending upon the physical characteristics of the fluid 28, particularly its viscosity and shear strength, a degree of torque will be imparted to the driven rotor 22 by virtue of the friction of the fluid upon the inner sides of the annular walls 26 and 27 of the driven rotor. The rotation of the driven rotor, that is, the torque imparted thereto by the driving rotor, is opposed by the friction of the assembly including the friction of the cam pin 42 in the cam slot 41.

The normal position of the switch comprising the contact points 37 and 38 when shaft 10 is stationary is closed, that is, the cam pin 42 is at the center of the cam slot 41. It will be noted, by reference to Figs. 2 and 3, that the end portions of the cam slot 41 are at greater radial distances from the axis of shaft 10 than the intermediate portion of the cam slot. Thus, when the cam pin 42 is at one of the terminal ends of the cam slot 41, the pin will be so moved relative to the axis of shaft 10 as to cause the separation of the contact points 37 and 38. Depending, however, upon the direction of rotation of the shaft 10, when the speed of the shaft 10 reaches a predetermined maximum the frictional force exerted between the driving rotor and driven rotor will be such as to cause the driven rotor to move. Movement of the driven rotor will cause relative movement of the cam pin 42 within the cam slot 41 until the cam pin reaches one end of the cam slot or the other at which time the contacts 37 and 38 will be opened and further relative movement of the cam pin 42 and driven rotor will be stopped.

It will be noted that as the cam slot moves so as to position the cam pin at one end of the cam slot 41 or the other the spring 34 will be tensioned, that is, said tension tends to close the contacts 37 and 38. However, when said predetermined maximum speed of shaft 10 has been reached the frictional connection between the driving and driven rotors will be such as to overcome the spring tension and to open the contacts. If and when the shaft 10 decreases in speed below said maximum, the spring 34 will tend to close the contacts 37 and 38 and will simultaneously tend to move the driven rotor in such a direction as to cause the cam pin to move relatively toward the center of the cam slot 41.

Accordingly, the present invention comprises a device which can control an external electric circuit in response to the rate of rotation of a rotating body. It will be noted that the period at which the switch is actuated is critical and depends upon the physical characteristics of the fluid 28, particularly its viscosity. The critical period is also dependent upon the strength of the spring 34. Hence, to make the device respond at a predetermined speed, it is merely necessary to either change the fluid which is employed or substitute a spring of different strength. It will also be noted that by virtue of the position and shape of slot 41 with respect to shaft 10 the device may be caused to exercise its characteristic control in either direction of rotation of shaft 10.

I claim as my invention:

1. A device which is responsive to the speed of rotation of a rotating body to actuate an electric switch which comprises, a rotatable body, a driving rotor secured to said rotatable body and rotatable therewith, a driven rotor rotatably mounted with respect to said driving rotor about a common axis, an annular body of a relatively viscous flowable material carried by said driving rotor and said driven rotor adjacent their peripheries whereby rotation of said driving rotor exerts a torque upon said driven rotor through the frictional resistance of said flowable material upon said rotors, a stationary support disposed adjacent said driven rotor, a cantilever spring mounted at one end upon said support, said driven rotor being provided with a relatively elongated cam slot having portions which are positioned at different distances from the axis of rotation of said rotors, a cam member carried upon said spring and having a portion thereof movable in said cam slot, a stationary electrical contact carried by said support adjacent the free end portion of said cantilever spring, a companion electrical contact carried by the free end portion of said spring for making electrical contact with said stationary contact when the torque exerted upon said driven rotor rotates the same, and conductors for connecting said contacts to an electrical circuit.

2. A device which is responsive to the speed of rotation of a rotating body to actuate an electric switch which comprises, a driving and a driven rotor rotatable about a common axis, means for rotating said driving rotor, an annular body of relatively viscous flowable material carried by said driving rotor and driven rotor whereby rotation of said driving rotor exerts a torque upon said driven rotor through the frictional resistance of said flowable material upon said rotors, an anchored cantilever spring mounted adjacent said driven rotor, said driven rotor being provided with an elongated cam slot having portions thereof at different distances from the axis of rotation of said rotors, a cam follower mounted upon said spring and having a portion thereof movable in said cam slot, a stationary electrical contact disposed adjacent the free end portion of said cantilever spring, a companion electrical contact carried by the free end portion of said spring for making electrical contact with said stationary contact when the torque exerted upon said driven rotor rotates the same, and means for connecting said contacts to an electrical circuit.

3. A device which is responsive to the speed of rotation of a rotating body to actuate an electric switch which comprises, a rotatable body, a driving rotor secured to said rotatable body and rotatable therewith, a driven rotor rotatably mounted with respect to said driving rotor about a common axis, an annular body of a relatively viscous flowable material carried by said driving rotor and said driven rotor adjacent their peripheries whereby rotation of said driving rotor exerts a torque upon said driven rotor through the frictional resistance of said flowable material upon said rotors, a stationary plate disposed adjacent said driven rotor, a cantilever spring mounted at one end upon said plate, said driven rotor adjacent said plate being provided with a relatively elongated cam slot having portions which are positioned at different distances from the axis of rotation of said rotors, the length of said cam slot being at substantially right-angles to the radial, a cam pin carried upon said spring and having a portion thereof movable in said cam slot, a stationary electrical contact carried by said plate adjacent the free end portion of said cantilever spring, companion electrical contact carried by the free end portion of said spring for making electrical contact with said stationary contact when the torque exerted upon said driven rotor rotates the same, and conductors for connecting said contacts to an external electrical circuit.

4. A device which is responsive to the speed of rotation of a rotating body to actuate an electric switch which comprises, a rotatable body, a driving rotor secured to said rotatable body and rotatable therewith, a driven rotor rotatably mounted with respect to said driving rotor about a common axis, said driving rotor being provided with an annular recess, said driven rotor being provided with an annular recess registering with the recess provided in said driving rotor to provide a substantially closed annular compartment, a body of a relatively viscous flowable material carried in said annular compartment whereby rotation of said driving rotor exerts a torque upon said driven rotor through the frictional resistance of said flowable material in said annular compartment upon said rotors, a stationary plate disposed adjacent said driven rotor, a cantilever spring mounted at one end upon said plate, said driven rotor adjacent said plate being provided with a relatively elongated cam slot having portions which are positioned at different distances from the axis of rotation of said rotors, a cam pin carried upon said spring and having a portion thereof movable in said cam slot, a stationary electrical contact carried by said plate adjacent the free end portion of said cantilever spring, companion electrical contact carried by the free end portion of said spring for making electrical contact with said stationary contact when the torque exerted upon said driven rotor rotates the same, and conductors for connecting said contacts to an external electrical circuit.

5. A device which is responsive to the speed of rotation of a rotating body to actuate an electric switch which comprises, a rotatable body, a driving rotor secured to said rotatable body and rotatable therewith, a driven rotor rotatably mounted with respect to said driving rotor about a common axis, said driving rotor being provided with an annular recess, said driven rotor being provided with an annular recess registering with the recess provided in said driving rotor to provide a substantially closed annular compartment, an apertured annular wall carried by said driving rotor and extending into said annular compartment, a body of a relatively viscous flowable material carried in said annular compartment and immersing said apertured wall whereby rotation of said driving rotor exerts a torque upon said driven rotor through the frictional resistance of said flowable material in said annular compartment upon said rotors, a stationary plate disposed adjacent said driven rotor, a cantilever spring mounted at one end upon said plate, said driven rotor adjacent said plate being provided with a relatively elongated cam slot having portions which are positioned at different distances from the axis of rotation of said rotors, a cam pin carried upon said spring and having a portion thereof movable in said cam slot, a stationary electrical contact carried by said plate adjacent the free end portion of said cantilever spring, companion electrical contact carried by the free end portion of said spring for making electrical contact with said stationary contact when the torque exerted upon said driven rotor rotates the same, and conductors for connecting said contacts to an external electrical circuit.

6. A device which is responsive to the speed of rotation of a rotating body to actuate an electric switch which comprises, a rotatable body, a driving rotor secured to said rotatable body and rotatable therewith, a driven rotor rotatably mounted with respect to said driving rotor about a common axis, an annular body of a relatively viscous flowable material carried by said driving rotor and said driven rotor adjacent their peripheries whereby rotation of said driving rotor exerts a torque upon said driven rotor through the frictional resistance of said flowable material upon said rotors, a stationary plate disposed adjacent said driven rotor in a plane substantially at right-angles to the axis of rotation of said rotors, a cantilever spring mounted at one end upon said plate, said driven rotor adjacent said plate being provided with a relatively elongated cam slot having portions which are positioned at different distances from the axis of rotation of said rotors, a cam pin carried upon said spring and having a portion thereof movable in said cam slot, a stationary electrical contact carried by said plate adjacent the free end portion of said cantilever spring, companion electrical contact carried by the free end portion of said spring for making electrical contact with said stationary contact when the torque exerted upon said driven rotor rotates the same, and conductors for connecting said contacts to an external electrical circuit.

No references cited.